(12) United States Patent
McAllister et al.

(10) Patent No.: US 6,724,881 B1
(45) Date of Patent: Apr. 20, 2004

(54) OPTIMIZATION OF CONNECTION PATHS IN A COMMUNICATIONS NETWORK

(75) Inventors: Shawn McAllister, Nepean (CA); Jonathan L. Bosloy, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/500,582

(22) Filed: Feb. 10, 2000

Related U.S. Application Data

(60) Provisional application No. 60/136,408, filed on May 27, 1999.

(51) Int. Cl.$^7$ .............................................. H04M 7/00
(52) U.S. Cl. ................... 379/220.01; 379/219
(58) Field of Search ........................... 379/219, 220.01, 379/221.01; 370/351

(56) References Cited

U.S. PATENT DOCUMENTS

| | | | | | |
|---|---|---|---|---|---|
| 5,444,773 | A | * | 8/1995 | Hirsohn et al. | 379/219 |
| 5,828,883 | A | * | 10/1998 | Hall | 395/704 |
| 5,892,822 | A | * | 4/1999 | Gottlieb et al. | 379/220 |
| 6,091,720 | A | * | 7/2000 | Bedard et al. | 370/351 |

FOREIGN PATENT DOCUMENTS

WO  WO 98/04097  1/1998

* cited by examiner

*Primary Examiner*—Creighton Smith
(74) *Attorney, Agent, or Firm*—Blake, Cassels & Graydon LLP

(57) ABSTRACT

A method for optimizing an established call routed across a network from an originating exchange to a destination exchange over a first connection path. The first connection path features a path metric of interest, such as administrative weight. A second connection path is identified which features an improved path metric, the path is made operative and the call is directed over the second connection path. Thereafter, the first connection path may be dismantled. The second connection path is preferably identified by signalling a call set-up message over the network, wherein the message incorporates a reporting field and each transiting exchange propagating the message updates the reporting field until it specifies the path metric of the replacement connection path traversed by the call set-up message. A connect message incorporating the reporting field back is signalled back to the originating exchange from the destination exchange. If the reporting field specifies an improved path metric the replacement connection path is then identified; otherwise the process may be repeated until such time as the second path is found. Alternatively, if the call set-up message includes a desired connection path metric value and the network is configured to clear back the call set-up message to the originating exchange in the event it is unable to identify any connection path to the destination exchange satisfying the desired path metric, the replacement connection path may be automatically accepted.

38 Claims, 10 Drawing Sheets

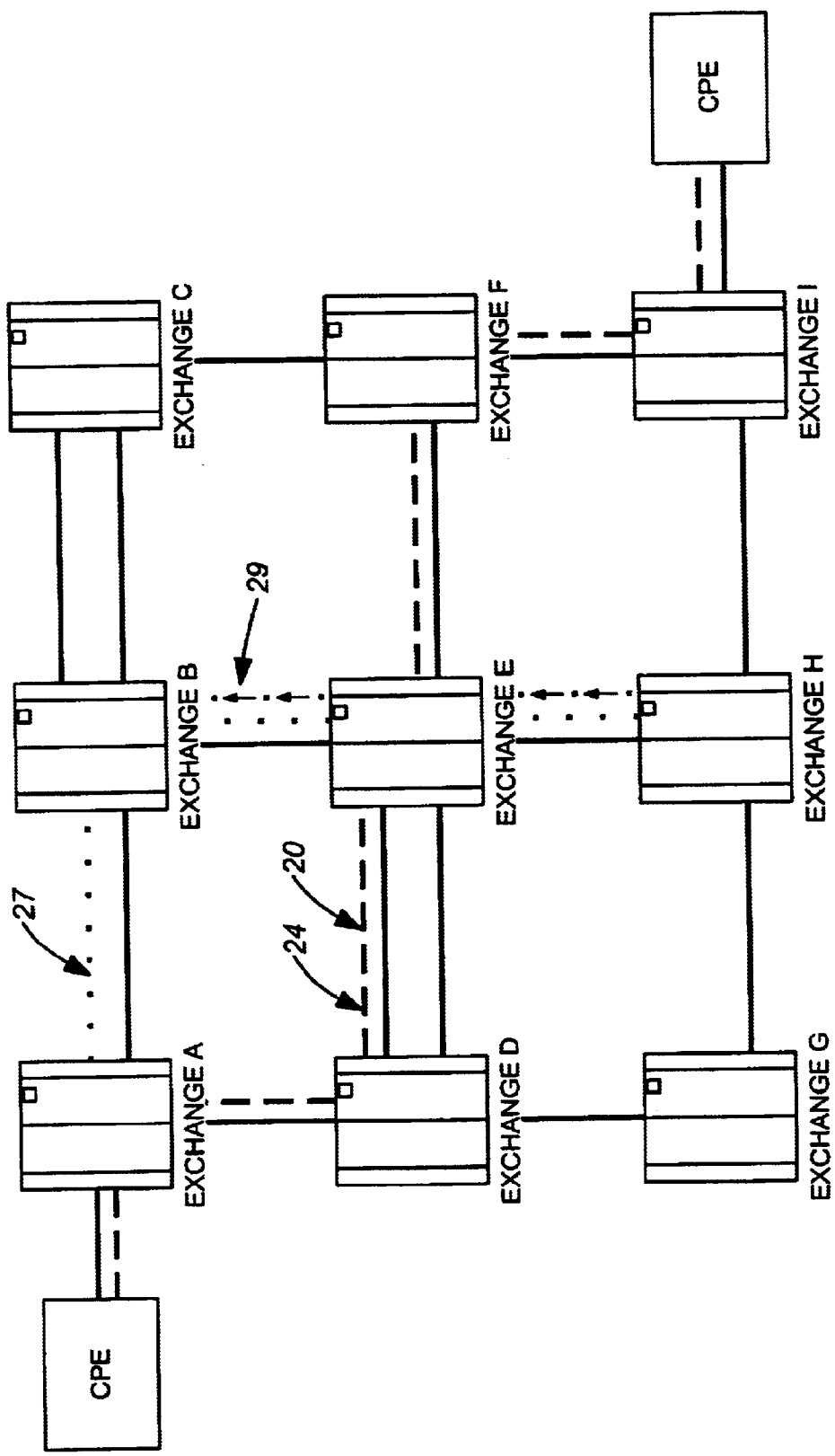

ers. More specifically, the network optimization involves re-routing the paths of established calls in order to optimize one or more path characteristics, such as cost, of individual calls.

OPTIMIZATION OF CONNECTION PATHS IN A COMMUNICATIONS NETWORK

This application claims the benefit of provisional application Ser. No. 60/136,408 filed May 27, 1999.

FIELD OF THE INVENTION

The invention generally relates to a method and apparatus for optimizing the routing of connections in communications networks. More specifically, the network optimization involves re-routing the paths of established calls in order to optimize one or more path characteristics, such as cost, of individual calls.

BACKGROUND OF THE INVENTION

In some circuit switched networks established connections may last on average only a few minutes. For instance, in public telephone networks this may be the case with typical voice calls. Consequently, the average voice call may reserve or lock up network resources for only a short time so that, in aggregate, the network resources are continuously being recycled between calls being released and those being established. However, the average call in digital communication networks typically lasts much longer. Calls in such digital networks often carry data traffic. The longevity of these calls means that network resources are tied up for much longer, making it important to select efficient connection paths in order to efficiently utilize network resources.

The calls associated with digital communication networks can assume a variety of forms. For instance, switched connections in an Asynchronous Transfer Mode (ATM) network include switched virtual circuits (SVCs) and soft permanent virtual circuits (SPVCs). These calls are set-up and torn down on demand via a signalling protocol. SVCs are initiated by end-users and signalled between originating and terminating end-user stations. SPVCs are initiated by the network administrator in order to dynamically establish a path between ingress and egress nodes or exchanges using the signalling infrastructure of the network. The connections between end-user equipment and the network are manually configured and remain active until terminated by the network administrator. SPVCs resemble permanent connections but are often preferred thereover because the network can typically provide faster fault restoration capabilities (e.g., in the event of link failure) than a central management authority. In any event, SPVCs can often have a very long life, comprising many months.

Path efficiency, and hence network optimization, can also assume a variety of forms or goals. In some instances, it may be desirable to minimize the cost or administrative weight of calls; or to use paths which feature packet transfer delays as close to maximum pre-specified limits established for calls. These are examples of economic efficiencies. In other instances, it may be desirable to minimize packet or cell loss ratios; to use paths with the least number of nodes and/or links; or to use paths which are least bandwidth-constrained. These are examples of performance efficiencies.

Most networks typically attempt to establish an efficient—albeit not necessarily the most optimal—path for a call when the call is initially established. However, the problem of finding an efficient path is exacerbated in networks which employ hierarchical map-based routing protocols, an example of which is the ATM PNNI protocol described in The ATM Forum Technical Committee, "Private Network-Network Interface Specification Version 1.0", doc. no. af-pnni-0055.000, March 1996, which is incorporated by reference herein. In such networks, predetermined groups of nodes or exchanges are generally represented as a single logical group node (LGN) to an external node (located outside of the group). This logical group node is an abstract representation of the topology of the corresponding group of physical nodes. As such, the logical group node can only provide a summary of the nodal and link characteristics of the corresponding physical topology to the external node. This form of topology aggregation is recursively repeated in a hierarchical manner such that logical group nodes at higher levels of the hierarchy represent a more and more summarized view of the nodal and link characteristics of the underlying physical topology to other nodes. In this manner, a call originating node only has to specify a hierarchically complete route to set up a call, leaving the detailed routing decision across a logical group node up to the entry switching system of the group of physical nodes represented by the logical group node. This hierarchical arrangement was designed in order to achieve scaling in large networks and support the source routing of calls.

The net result, however, is that when an originating node or exchange is required to route a call using a hierarchical routing protocol it can only base its routing decision (to determine the most optimal path) at set-up time using summarized nodal and link characteristics. Depending on how many levels the hierarchy in question comprises, the summarized nodal and link characteristics along the hierarchical path selected by the originating exchange may vary significantly from the characteristics of the actual path assumed by the call. This, then, poses a problem in terms of selecting an efficient path for each call, and hence optimizing the network in the aggregate, in the first instance. Moreover, even if an acceptably efficient path for a call is selected in the first instance, network utilization evolves over time. A more efficient path for the call may exist at some later time.

SUMMARY OF INVENTION

Broadly speaking, one aspect of the invention provides a method of optimizing path selection in a communications network. The method involves selecting an established call routed across the network from an originating exchange to a destination exchange over an established path. This established path will have at least one path metric of interest associated therewith. A second connection path to the destination exchange from the originating exchange is identified which features one or more improved path metrics. This second path is made operative and the call is directed thereover. Thereafter, the first connection path may be cleared. The process may be repeated for each call originating at each node in the network.

The step of identifying the second connection path may involve:

(a) signaling a first message from the originating exchange to the destination exchange over a replacement connection path, wherein the first message incorporates at least one reporting field and each exchange propagating the first message updates the reporting field(s) until it specifies the path metric(s) of the replacement connection path;

(b) signaling a second message incorporating the reporting field(s) back to the originating exchange from the destination exchange.

The replacement connection path is selected as the second connection path provided that either:

(a) the originating exchange checks whether the replacement connection path features an improved actual path metric(s) by testing the value of the received reporting field(s) against the actual path metric(s) of the first connection path, or (b) a desired connection path metric value(s) is included in the first message and the network is configured to clear back the first message to the originating exchange in the event the network is unable to identify any connection path to the destination exchange satisfying the desired path metric(s).

The invention also discloses a method for optimizing path selection in a communications network, having a plurality of interconnected exchanges, which involves:

(a) selecting an established call, the call being associated with a path metric(s) of interest and routed across the network from an originating exchange to a destination exchange over a first connection path featuring an actual path metric(s);

(b) signaling a first message to the destination exchange from the originating exchange over a second connection path, wherein the message incorporates a reporting field(s) and each exchange propagating the message updates the reporting field(s) until it specifies the actual path metric;

(c) signaling a second message incorporating the reporting field(s) back to the originating exchange from the destination exchange;

(d) directing the call over the second connection path provided it features an improved actual path metric(s); and (e) thereafter dismantling the first connection path.

The invention also discloses a method for optimizing path selection in a communications network having a plurality of interconnected exchanges, which involves:

(a) selecting an established call, the call being routed across the network from an originating exchange to a destination exchange over a first connection path which is associated with a path metric of interest;

(b) signaling a call set-up message from the originating exchange to the destination exchange over the network, wherein the call set-up message incorporates a desired connection path metric value and a corresponding reporting field, and wherein each exchange propagating the call set-up message updates the reporting field;

(c) clearing back the call set-up message in the event the network is unable to identify any connection path to the destination exchange satisfying the desired path metric, and signaling a connect message back to the originating exchange from the destination exchange in the event the network is able to identify a connection path satisfying the desired path metric;

(d) directing the call over the second connection path; and (e) thereafter dismantling the first connection path.

According to another aspect of the invention there is provided a method of establishing calls in an ATM network running, PNNI, comprising:

(a) assigning an administrative weight to each physical network element belonging to a predefined type of topological element;

(b) signaling a call set-up message to a destination exchange from an originating exchange over a connection path, wherein the call set-up message incorporates a cumulative administrative weight reporting field and each transiting exchange propagating the call set-up message adds the pre-provisioned administrative weights of topological elements associated therewith until the reporting field specifies the cumulative administrative weight of the connection path;

(c) establishing bearer channel cross-connections on the nodes traversing the connection path; and (d) signaling a connect message incorporating the reporting field back to the originating exchange from the destination exchange.

BRIEF DESCRIPTION OF DRAWINGS

The foregoing and other aspects of the invention are discussed in greater detail below with reference to the drawings, provided for the purpose of description and not of limitation, wherein:

FIGS. 6A–6C illustrate changes of state to the reference network when crank-back procedures are invoked during path selection optimization.

DESCRIPTION OF PREFERRED EMBODIMENTS

An embodiment of the invention is disclosed in relation to a connection-orientated broadband integrated services digital network (B-ISDN) such as an ATM network running PNNI or IISP (Interim Inter-switch Signalling Protocol—see ATM Forum doc. no. af-pnni-0026.000, December 1994). It will become apparent that the invention may be deployed in other types of connection orientated networks such as Frame Relay, narrowband ISDN, and tag-switched or multi-protocol label switched (MPLS) networks.

Figure 1A:
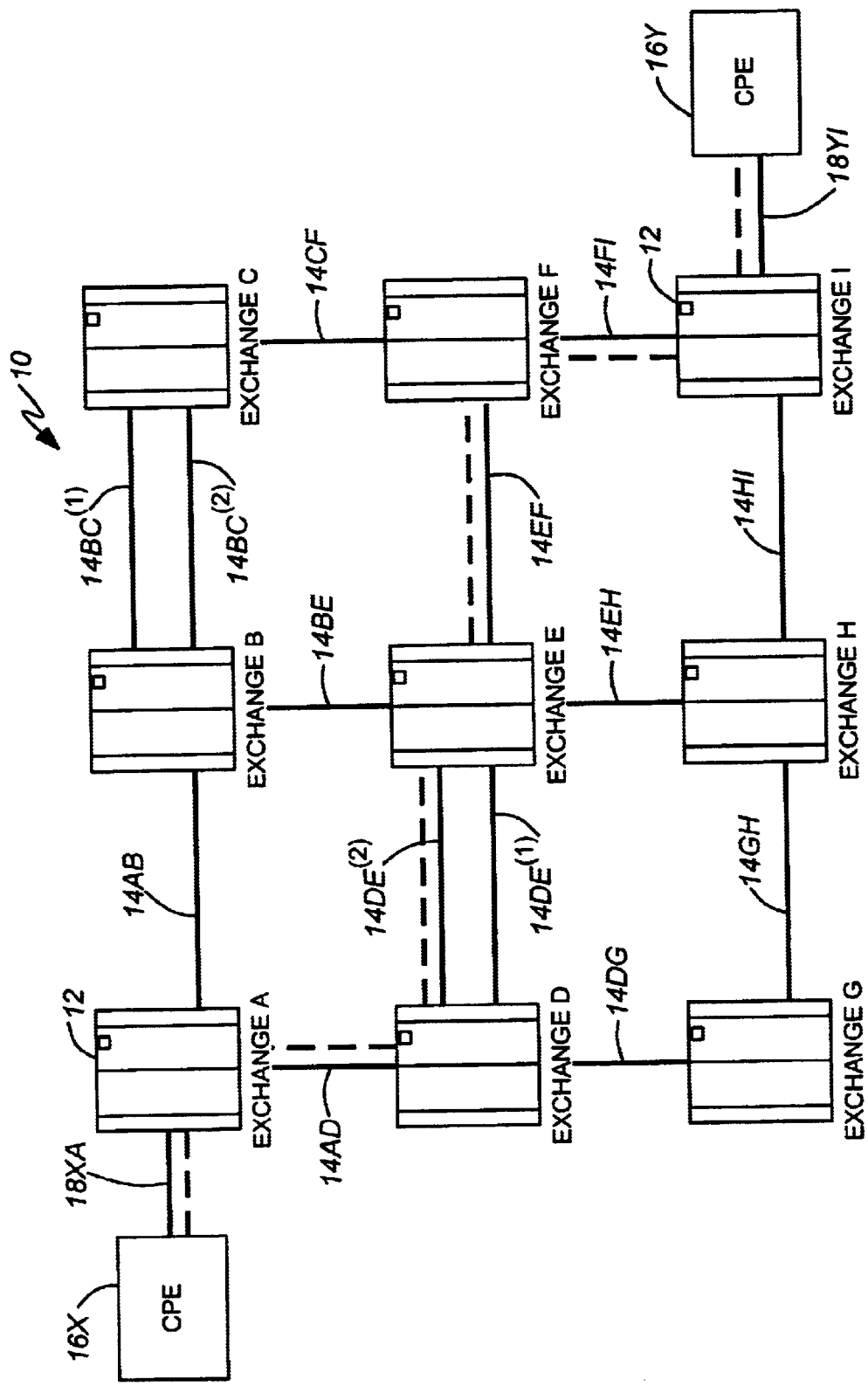
FIGS. 1A–1C illustrate a reference network and the changes of state thereto as a selected call in the network is optimized in accordance with one embodiment of the invention.
Figure 1B:
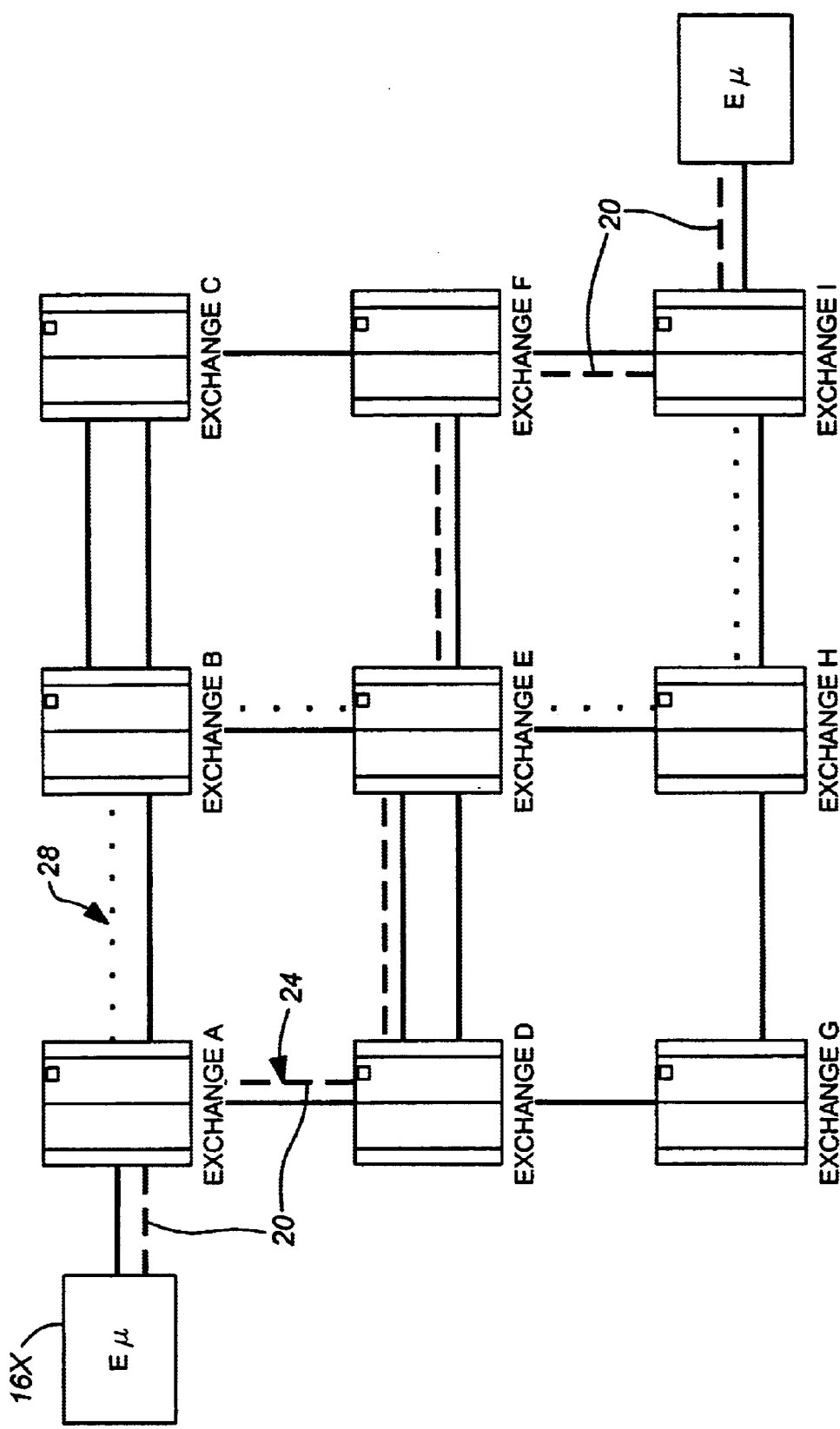
Figure 1C:
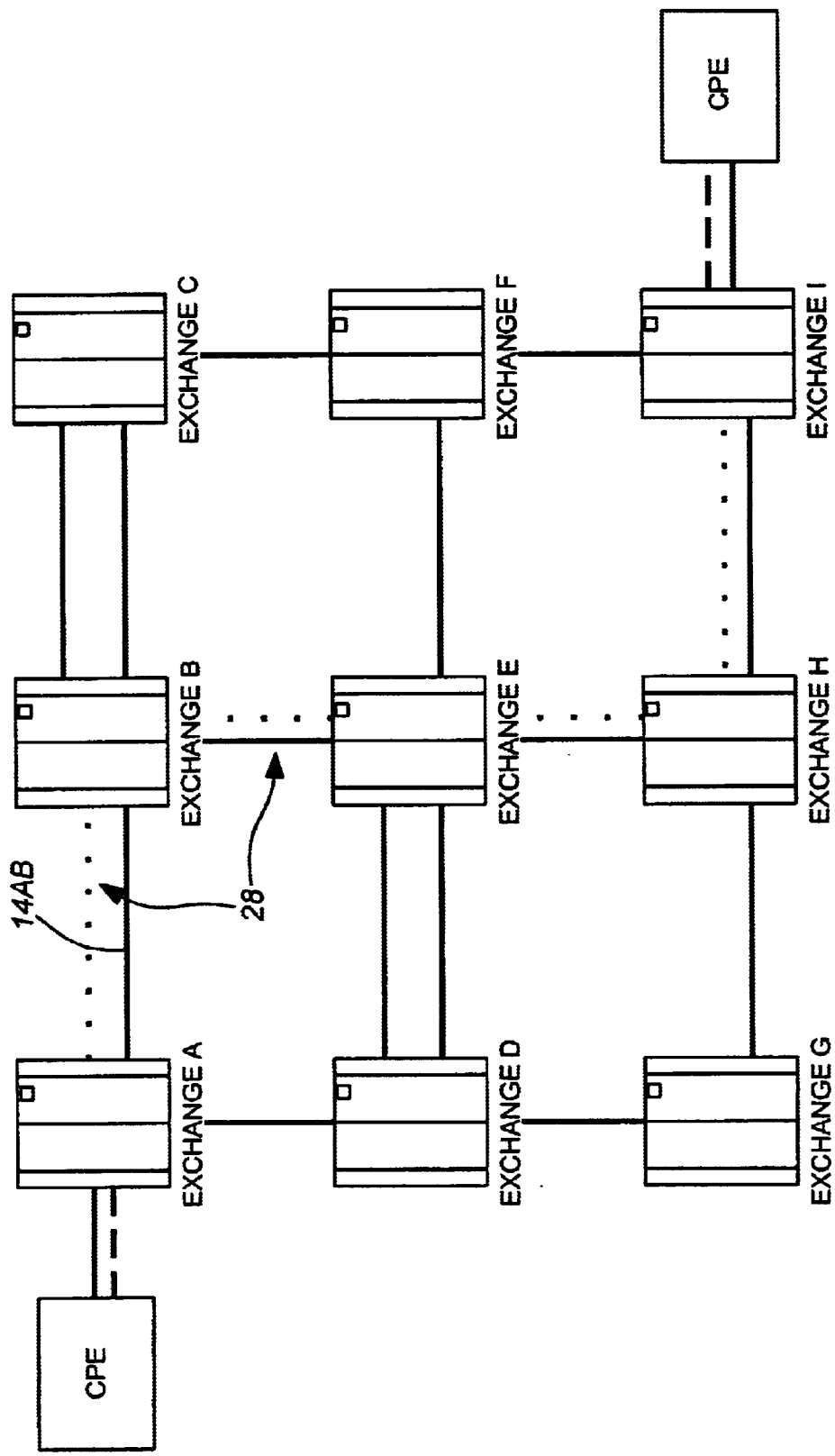

FIGS. 1A, 1B and 1C show a reference ATM digital communications network 10 comprising a plurality of switches or nodes, hereinafter "exchanges" 12, which are individually labelled with an alphabetic identifier "A" to "I". The exchanges 12 are interconnected via physical interfaces (not explicitly shown) which provide at least one logical link 14 providing a certain amount of bandwidth capacity between the exchanges, as shown. For convenience, the reference number designating each link bears an alphabetical suffix which designates the exchanges connected by the link, e.g., link 14AB interconnects exchanges 12A and 12B. The links 14 each carry a number of virtual channels such as virtual connection (VC) or virtual path (VP) bearer channels. Additionally, at least one channel is reserved for signalling purposes between adjacent exchanges 12. The exchanges 12, in turn, include signalling modules for performing the functions and procedures of the signalling protocol used by the network 10. Collectively the signalling modules and signalling channels provide the signalling infrastructure of the network 10.

End user customer premise equipment (CPE) 16 are connected to the exchanges 12 via links 18. In the reference network, the end-user equipment 16X and 16Y are respectively connected to exchanges 12A and 12I via user-to-network links 18XA and 18YI.

In the network 10 a call 20 has been established between CPE 16X and 16Y. The call spans the network between gateway or border exchanges 12A and 12I. The call may be unidirectional or bidirectional, meaning data may flow only one way or both ways between CPE 16X and 16Y The call 20 may be an SVC in which case the bearer channels across links 18XA and 18YI were dynamically established via a user to network interface signalling protocol. Alternatively, the call 20 may be an SPVC in which case the bearer channels across links 18XA and 18YI were administratively configured. The call 20 may alternatively resemble other types of calls. For purposes of description, however, assume that call 20 is an SPVC, exchange 12A is the calling party and the originating exchange, and exchange 12I is the called party and destination exchange, although the converse is also possible. (Note that if the call were an SVC, CPE 16X would be calling party and CPE 16Y the called party but the characterization of the exchanges remains the same.)

Call 20 is routed (FIG. 1B) along a first connection path 24 comprising exchange 12A, link 14AD, exchange 12D, link 14DE, exchange 12E, link 14EF, exchange 12F, link 14FI, exchange 12I. Depending on the routing and signalling protocol used by the network, each of the links and possibly the exchanges are associated with one or more topological connection state attributes. These may include, for instance, administrative weight or cost; peak or average bandwidth rates; packet transfer delay; and packet loss ratio. Each connection path will therefore typically have a corresponding path metric which is determined by combining or otherwise considering the attributes defined for all of the topological elements along the path. Some of these attributes may be cumulative in nature along a path. Other attributes which are non-cumulative in nature will define minimum or maximum constraints. For instance, an administrative weight metric for a given path is computed by adding the administrative weights of all of the links and nodes (if defined) in that path. On the other hand, a bandwidth metric is typically computed by determining the minimum peak or average bandwidth provided by topological elements along a path. Similarly, a packet transfer delay metric is an accumulation of transfer delays attributes, and a packet loss metric is defined by the maximum packet loss attribute along a path.

As is typical with most networks, network 10 attempted to use an efficient or optimal connection path for call 20. What is "efficient" is judged in comparison to the quality of service (QoS) required by the call as well as by network management policies. For instance, a call in an ATM network requesting a constant bit rate connection will typically specify the required bit rate and cell transfer delay. To meet these QoS parameters the call will thus require a connection path with suitable corresponding peak bandwidth and cell transfer delay metrics. In addition, network management policies may specify that the call be routed through a connection path which is efficient in terms of a predefined economic or performance goal (and which otherwise meets the requested QoS in order to optimize usage of network resources. In the present example, the optimization goal of network 10 is the selection of the least costly (or lowest administrative weight) connection path. Thus, if network 10 is a source routed network, the originating exchange 12A selects the least costly hierarchical connection path available to it. Similarly, if network 10 is a hop-by-hop routing network, each exchange involved in setting up the call would select the least costly link available to it in order to reach the destination exchange 12I. In either case, this policy in conjunction with the QoS requested by call 20 resulted in the call being routed over connection path 24.

Connection path 24, however, was evaluated at the time call 20 was initially established. At some later time, or even when the call was established, there may exist a second connection path having a lower cost metric.

Figure 2:
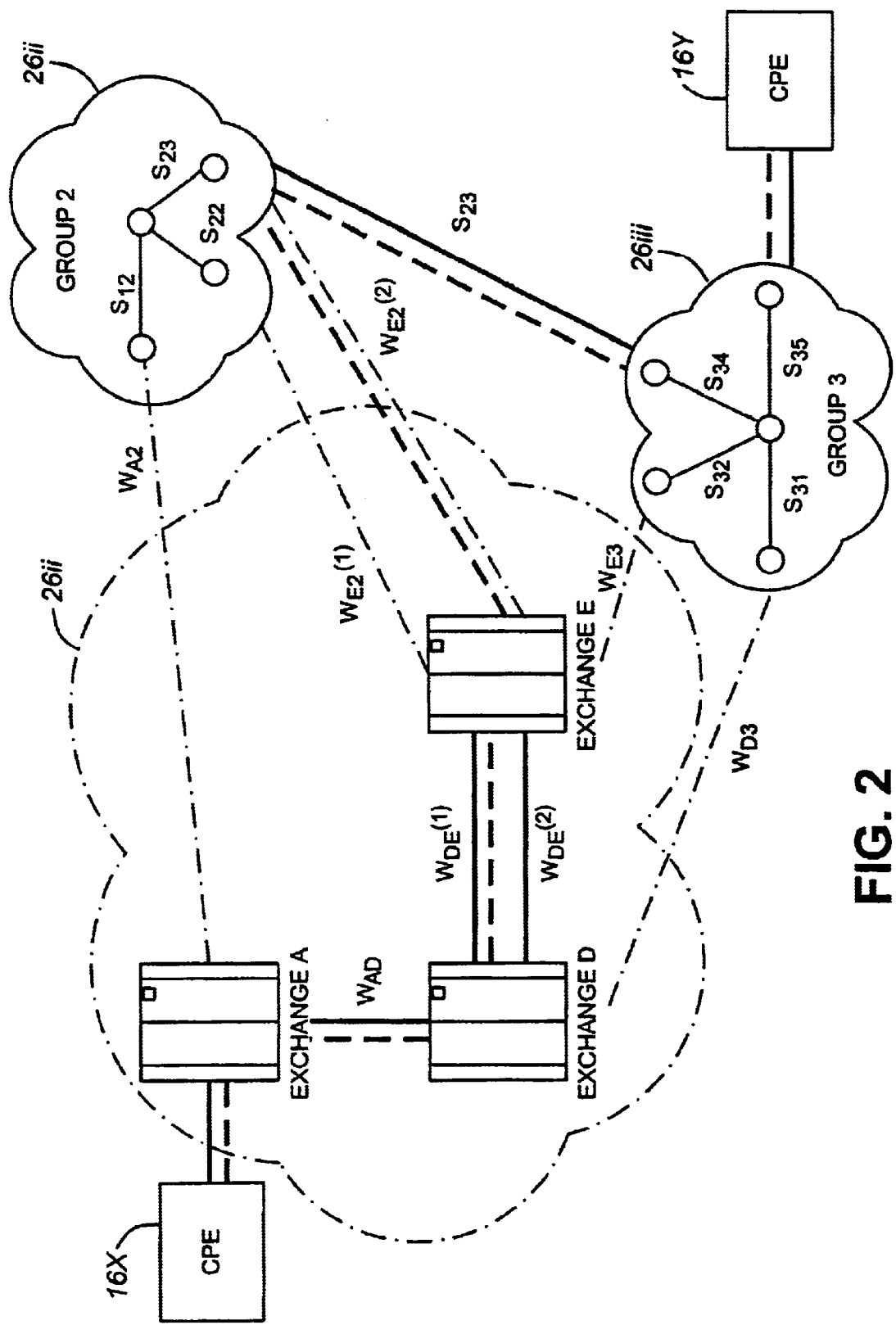
FIG. 2 depicts a possible hierarchical topology for the reference network.

For instance, FIG. 2 shows network 10 configured as a two-level hierarchical network under PNNI wherein exchanges 12A, 12D and 12E form one peer group 26$i$, exchanges 12B, 12C and 12F form a second peer group 26$ii$, and exchanges 12G, 12H and 12I form a third peer group 26$iii$. FIG. 2 further shows the topology of the network from the viewpoint of originating exchange 12A. This exchange is aware of real weights Wij of the links within peer group 26$i$ and (perhaps incompletely) those links Gij connecting to the other peer groups 26$ii$ and 26$iii$. However, these other peer groups appear to exchange 12A as a single logical complex node featuring a "hub and spokes" design. Due to the process of topology aggregation the weights Sij of the virtual links advertised by these logical complex nodes are only a summarized, and perhaps inaccurate, reflection of the real weights of the links in the underlying physical topology. Thus, it is possible for the originating exchange 12A to have routed call 20 as shown in FIG. 2 (which corresponds to connection path 24 in FIG. 1A) when in fact a better real connection path was readily available when the call was established.

Of course, even if the most optimal available connection path was selected when call 20 was established, network resources may have subsequently freed up in which case a more optimal connection path may exist at a later time.

According to one aspect of the invention, each exchange 12 includes logic to intermittently attempt to re-route the connection paths of established calls in order to improve upon at least one desired connection path metric. Generally speaking, the method implemented by such distributed logic involves selecting an established call, identifying a second connection path to the destination exchange for that call which features an improved path metric, making the second path operative, and rolling the call thereover. Thereafter, the original connection path may be cleared or dismantled.

Figure 3:
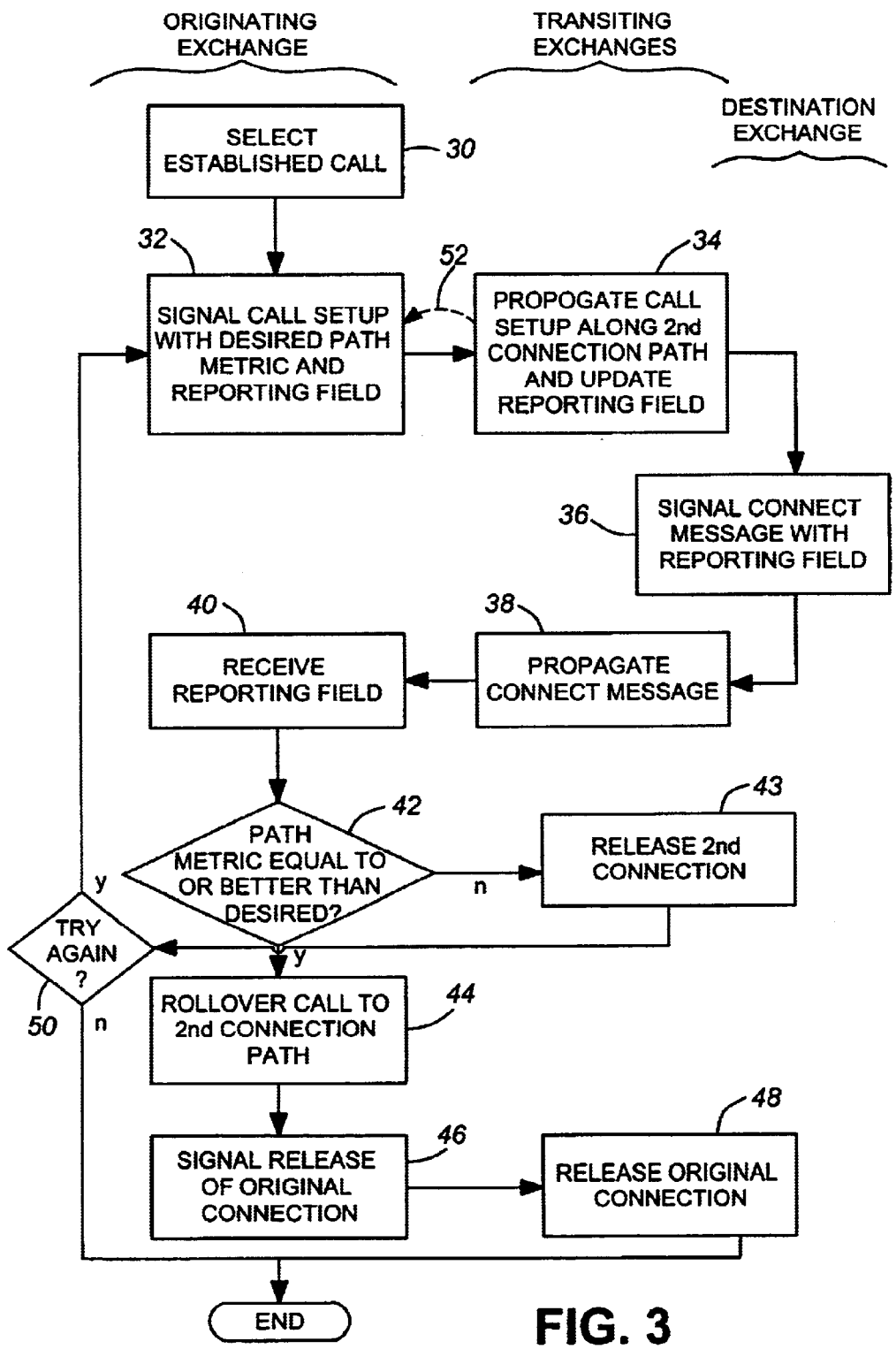
FIG. 3 is a flowchart of the steps executed by various network exchanges in optimizing a selected call in accordance with one embodiment of the invention.

In one embodiment of this aspect of the invention, the signalling infrastructure of network 10 is used to establish the second connection path, as described more fully with reference to the flowchart shown in FIG. 3 which illustrates the actions taken by the originating exchange and the remainder of the network. The reference network 10 is used to illustrate this method.

As a first step 30, originating exchange 12A selects established call 20, routed over connection path 24, to be optimized.

At step 32 the originating exchange 12A signals a call set-up message 28 as known in the art (See FIG. 1B) specifying the QoS parameters for call 20. The call set-up message preferably carries or otherwise incorporates (1) the value of a connection path metric which a new connection path must meet in order to optimize the call (generically referred to as the "maximum permissible value"), and (2) a field for reporting the actual value of the pre-selected metric along the connection path created by the propagation of the call set-up message across the network (generically referred to as the "reporting field"). For the optimization goals of the reference network, the call set-up message carries or includes an administrative weight information element (IE)

Figure 4:
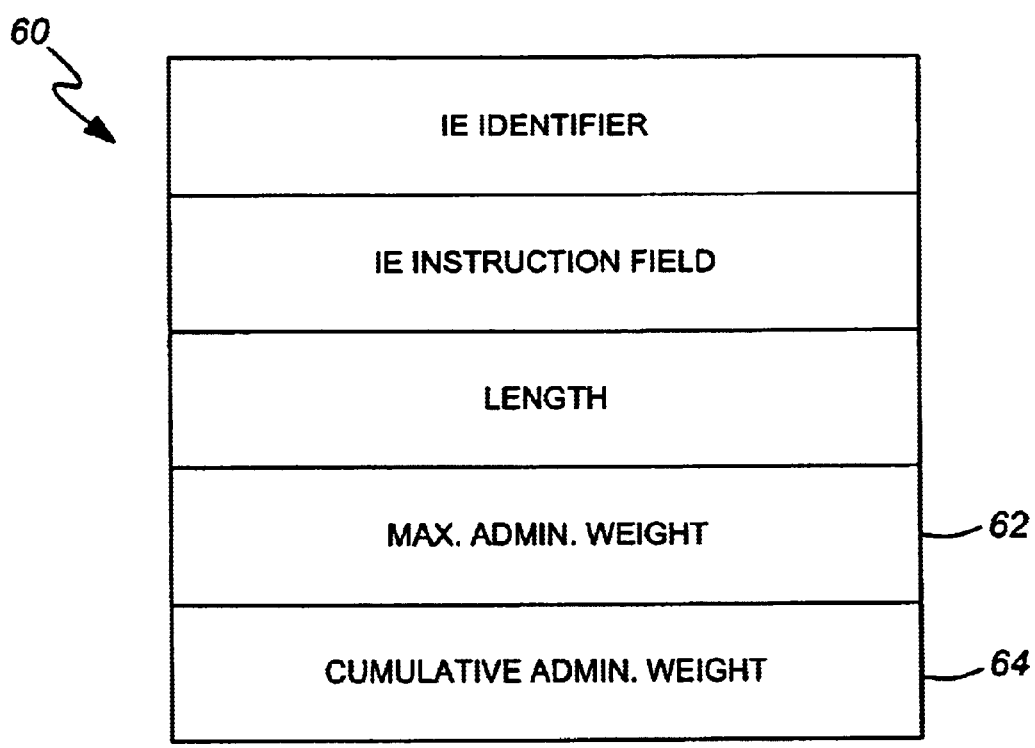
FIG. 4 is a diagram of an information element used for optimizing a call.

60 which is shown in FIG. 4. IE 60 includes a Maximum Administrative Weight field 62 which specifies the maximum permissible administrative weight that this newly requested connection path may possess. This field 62 is set to a value preferably lower than the administrative weight of connection path 24 in order to ensure that the new path will be no costlier than, and preferably less costlier than, the present connection path 24. IE 60 also includes a Cumulative Admin. Weight Field 64 which functions as the field for reporting the administrative weight metric of the new path.

In instances where the network 10 runs the source-routed PNNI protocol, originating exchange 12A will have a hierarchically complete record of connection path 24, as shown in FIG. 2. The optimization logic of originating exchange 12A may thus be able to select a different hierarchical path, if possible, or re-specify the original hierarchical path in the event the entry switching systems of peer groups 26i and 26iii select a different, more optimal path therethrough than that taken by path 24. Similarly, where network 10 runs the hop-by-hop IISP protocol, the network exchanges attempt to find the lowest cost hops towards the destination exchange.

At step 34, the network 10 propagates the call set-up message and in the process defines the second connection path 28. Each exchange transiting the call set-up message establishes a bearer channel cross-connection (not shown), as known in the art, in order to contemporaneously establish the second connection path 28. In addition, each transiting exchange updates the reporting field. Thus in this example each transiting exchange of reference network 10 adds the administrative weight of the link and, if applicable, the weight of the node traversed to the Cumulative Admin. Weight field 64. Accordingly, when the call set-up message reaches destination exchange 12I field 64 will specify the administrative weight metric for the second connection path 28, accumulated on a leg by leg basis.

At step 36, the destination exchange 12I signals a connect message as known in the art back to originating exchange 12A. The message is propagated by the network at step 38. The connect message carries the reporting field, e.g. field 64, back to the originating exchange 12A. For instance, this may be accomplished in this example by incorporating the entire Admin. Weight IE 60 into the connect message.

At step 40, the originating exchange 12A receives the connect message and the path metric reporting field, such as field 64. At step 42, the optimization logic of originating exchange 12A decides whether the reported path metric is equal to or better than the desired metric. If so, then at step 44, the originating exchange will direct call 20 over the new connection path 28. This generally involves reconfiguring the cross-connection on the originating exchange 12A so that the endpoint on link 18XA becomes connected to an endpoint on the first link 14AB (See FIG. 1B) of connection path 28 as opposed to the first link 14AD of original path 24. The detailed mechanisms for effecting a "bridge and roll" or "make before break" connection will depend on the particular type of equipment used and are generally known in the art. See, for instance, PCT Publication No. WO98/04097 published Jan. 29, 1998 entitled "High Availability ATM Virtual Connections" and assigned to the assignee of this application, which is incorporated herein by reference in its entirety.

Once call 20 is operative over the second connection path 28 then at step 46 the originating exchange 12A clears or dismantles the original connection path 24 by signalling a call release message as known in the art. The call release message is propagated by the network to the destination exchange 12I, and all the exchanges 12 along the original connection path 24 dismantle their bearer channel cross-connects in relation to path 24. This is shown in FIG. 1C where call 20 is now routed over second connection path 28.

At step 42, however, if the optimization logic of originating exchange 12A decides that the cost of the second path 28 is not an improvement over the cost of original path 24, or that the improvement has not exceeded a predetermined threshold, e.g., more than five percent (5%) less costly, then control flows to step 43 wherein the originating exchange 12A signals the release of the second path 28 whereby the network dismantles the bearer channel cross-connections of the second path 28 as known in the art. After signalling the release of the second path control then flows to step 50 wherein a decision is made whether to re-signal the call set-up message in order to attempt to find a better connection path for the call. The decision to re-signal may be based on a variety of factors such as number of attempts already undertaken, elapsed time from a previous attempt, or other parameters that will be apparent to those skilled in this art.

The foregoing may then be repeated to optimize another selected call.

Figure 5:
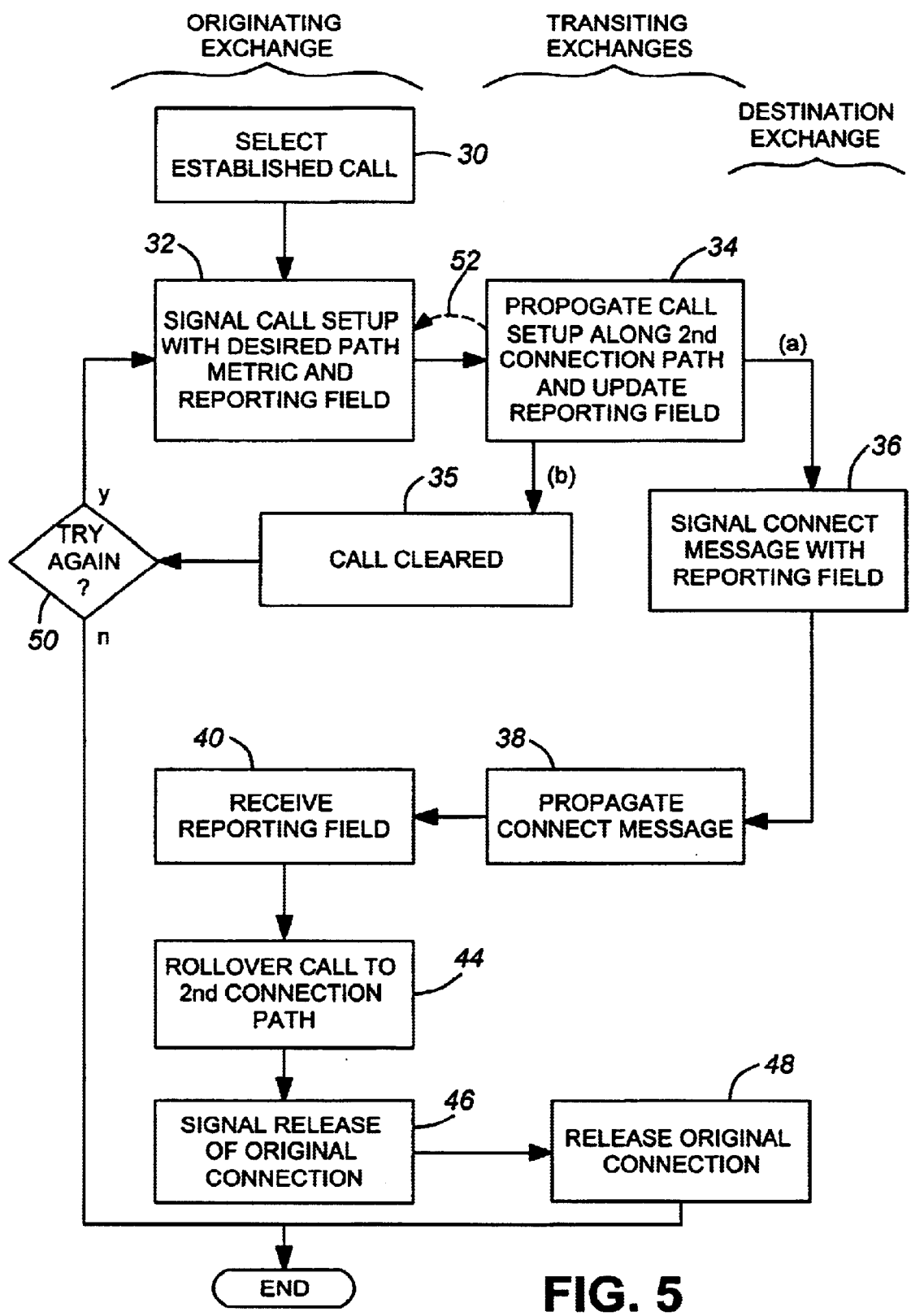
FIG. 5 is a flowchart of the steps executed by various network exchanges in optimizing a selected call in accordance with another embodiment of the invention.

In the foregoing it has been assumed that the network uses a best efforts policy to find a second path to the destination exchange, which path may or may not be an improvement over the original path 24. In this case step 42 is required to ensure that the reported path metric is at least as good as the desired path metric. However, if the call set-up message carries a maximum permissible value path metric such as Max. Admin. Weight field 62, the transiting exchanges which process and update the reporting field may alternatively be configured to not allow the cumulative path metric to exceed the maximum permissible value. If this cannot be avoided at any given exchange, then the call is either cranked back, as discussed shortly below, or cleared back to the originating exchange 12A if a suitable second connection path is ultimately not found. If the network is configured in this manner then step 42 (of FIG. 3) is unnecessary since, by definition, if a second connection is established it has a path metric equal to or better than the maximum permissible value, and thus the originating exchange 12A can simply accept the new path. This is shown in the flowchart of FIG. 5 where, at step 34, two (2) possible outcomes (a) and (b) exist, outcome (a) being a successful establishment of the second path, and outcome (b) being an unsuccessful establishment of the second path resulting in the call being cleared back at step 35 to the originating exchange.

On the other hand, the method may be performed by incorporating only the reporting field in the call set-up message, without the maximum permissible value. In this case step 42 as shown in the flowchart of FIG. 3 will be required since the originating exchange will have to judge whether any established second connection meets the criteria of being a better or improved path.

Figure 6B:
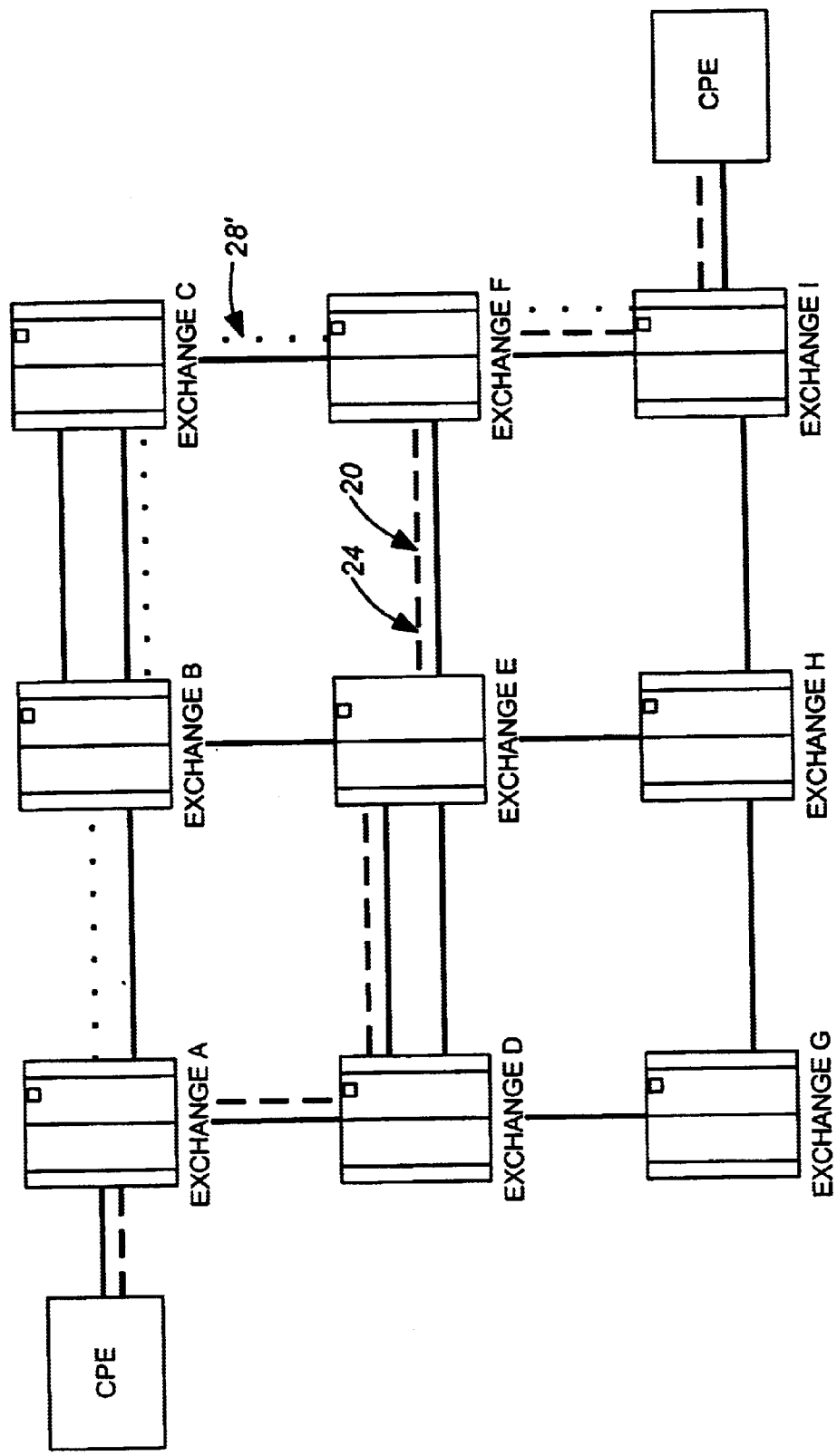
Figure 6C:
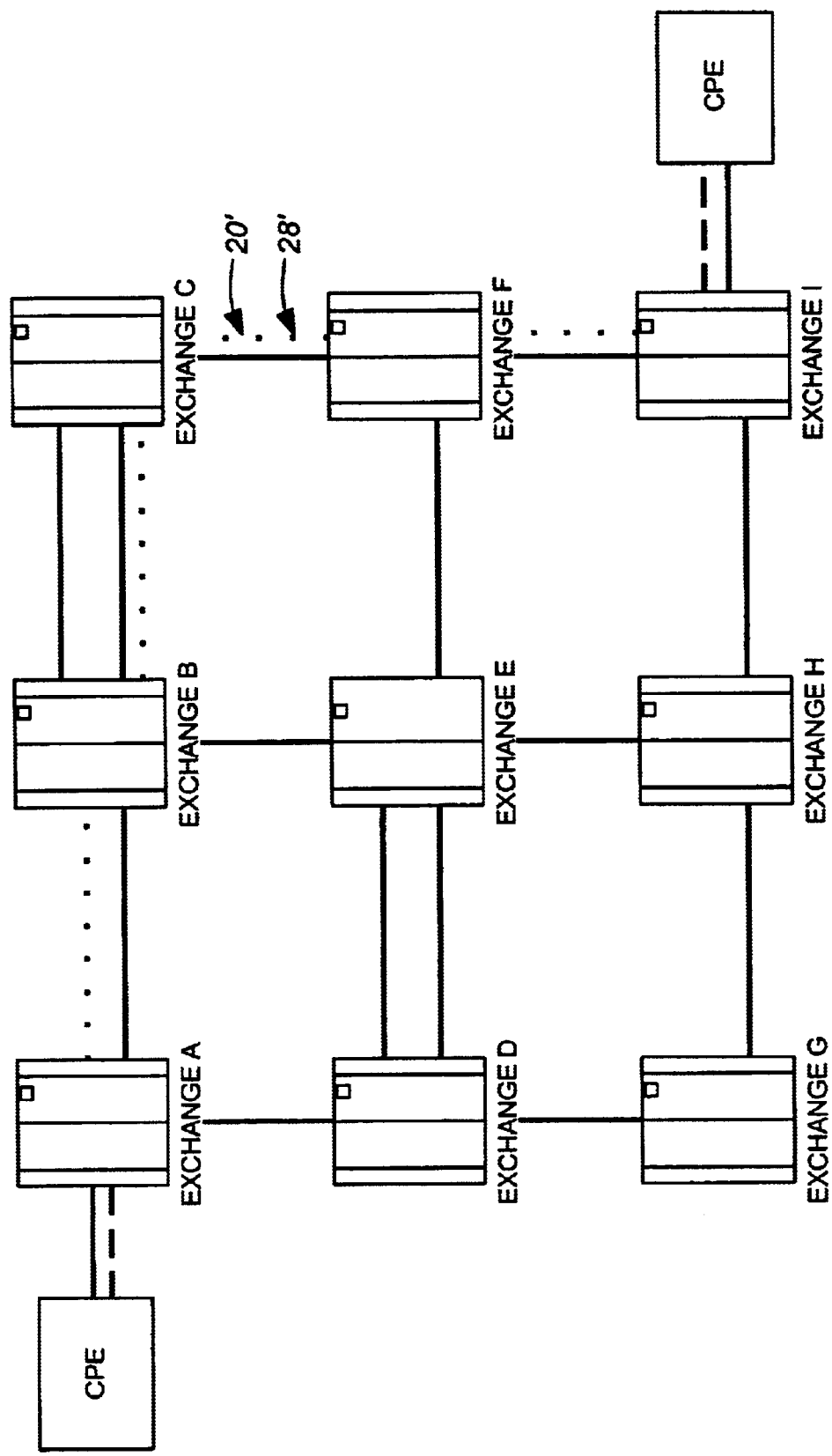

It should also be noted that the signalling infrastructure of the network may execute steps 32 and 34 a number of times, as symbolized by arrow 52 (FIG. 5), before another connection path having a better path metric is found. This is because network 10 may institute crankback procedures as known in the art when the network is unable to progress the call set-up message due to the unavailability of a suitable link. In this case the call set-up message is returned to a previous exchange in accordance with the particular signalling protocol employed in order to seek a new path through the network. This is exemplified in FIG. 6A (where the peer groups are not shown) where the call set-up message retraces a portion 29 of a path 27 it had followed to exchange 12H. The call set-up message returns to exchange 12B which, as shown in FIG. 6B, finds an alternative second connection path 28' (FIG. 6B) that features a better path metric than original connection path 24. The call 20 may then be routed along this second connection path 28', as shown in FIG. 6C.

It should also be noted that the call set-up message may carry two or more connection path metrics, e.g., administrative weight and cell transfer delay, and two or more reporting fields, which may be used to determine if a second connection path is "better". In this case, the optimization scheme may be configured so that second connection path would have to feature improvements in both metrics. Since the criteria for what constitutes an improvement may be complex, then the method as illustrated in the flowchart of FIG. 3 is normally to be preferred since the originating exchange may examine the returned reporting field when the second path is established in order to make the decision.

Alternatively, one of these connection path metrics may be optimized—the selected metric being dynamically chosen either through configuration or via signalling. In this case, either of the methods illustrated in FIGS. 3 and 5 may be employed, depending on the behaviour of the network, the existence or lack thereof of the maximum permissible values for the path metrics, and the values thereof if present.

In the still further alternative, a combination of the methods illustrated in FIGS. 3 and 5 may be employed where two or more connection path metrics are used to optimize a call. More particularly, the network in accordance with the method illustrated in FIG. 5 can optimize one of the metrics, and if the network accepts the replacement path, then the originating exchange can subsequently accept or reject the replacement based on the value of the second path metric.

A second aspect of the invention relates to determining the actual cost of a connection path in a network employing a hierarchical map-based routing protocol such as PNNI. The PNNI network as it is currently defined assigns administrative weights to links and nodes, and the call set-up message may carry an administrative weight information element. However, these administrative weights are only the summarized weights of the mapping hierarchy, e.g., weights Sij in FIG. 2. No mechanism exists for determining, reporting and taking action based upon the actual administrative weight (i.e., accumulated on a leg by leg basis) of a connection path in the PNNI protocol. In contrast, the call set-up message and procedures described herein for updating administrative weight IE 60 having fields 62 and 64 enables the actual connection path metric to be determined in order to base routing decisions thereon.

A third aspect of the invention relates to optimization of the connection path of a call at the time of its establishment. Generally speaking, this is accomplished by signalling the call set-up message incorporating a desired path metric a repeated number of times, each time improving the value of the path metric until no further path can be identified. This process may run as a low priority background task on the computing elements of the originating exchange and the remainder of the network. Pre-set limits may be provisioned as to how many attempts may be tried before the network settles on a path. Also, an improvement threshold may be set so as not to unduly waste time re-routing paths having only marginally incremental improvements in the path metric. This aspect of the invention has particular utility with respect to SPVCs which are not as demand-driven by end-users as are SVCs.

Those skilled in the art will appreciate that numerous variations and modifications may be made to the embodiments described herein without departing from the spirit of the invention.

We claim:

1. A method of optimizing an established call in a communications network having a plurality of interconnected exchanges, wherein said call is routed across the network from an originating exchange to a destination exchange over a first connection path, the method comprising:
   (a) identifying a second connection path to the destination exchange from the originating exchange which second path has a path metric that is an improvement over a path metric associated with the first connection path; and
   (b) making the second connection path operative and directing said call thereover.

2. The method according to claim 1, including clearing the first connection path after making the second connection path operative and directing said call thereover.

3. The method according to claim 1, wherein the identification of said second connection path and making it operative comprises:
   (a) signaling a call set-up message to the destination exchange from the originating exchange over the network thereby identifying a replacement connection path, wherein the call set-up message incorporates a field for reporting a path metric and each exchange propagating the message updates, if necessary, the reporting field until it specifies the path metric of the replacement connection path; and
   (b) signaling a connect message incorporating the reporting field back to the originating exchange from the destination exchange.

4. The method according to claim 3, wherein the path metric of the replacement connection path is an actual path metric thereof.

5. The method according to claim 4, wherein the actual path metric is an accumulation of topological state connection attributes, whereby each exchange propagating the call set-up message overwrites the reporting field.

6. The method according to claim 4, wherein the actual path metric is a non-cumulative consideration of topological state connection attributes in order to identify a maximum or minimum constraint, whereby only exchanges reporting a topological attribute above or below a value received in the reporting field overwrite the reporting field.

7. The method according to claim 4, wherein said replacement connection path is selected as said second connection path provided that the originating exchange checks whether the replacement connection path features an improved path metric by testing a value of the received reporting field against a first path metric of the first connection path.

8. The method according to claim 7, wherein each exchange propagating the call set-up message establishes a bearer channel cross-connection along the replacement connection path.

9. The method according to claim 7, wherein the clearing of connection paths includes dismantling bearer channel cross-connections on the exchanges.

10. The method according to claim 7, wherein the replacement connection path is determined by any one of:
   (i) the network using a hop-by-hop routing protocol,
   (ii) the originating exchange using a source routing protocol, and
   (iii) a centralized network management system.

11. The method according to claim 10, wherein the source routing protocol is a hierarchical map-based protocol and transiting exchanges of the network assist in identifying the replacement connection path through a group of exchanges which are summarized by the originating exchange.

12. The method according to claim 7, wherein
for the first connection path, the first path metric is an actual path metric thereof; and
the step of signaling said call set-up message is repeated one or more times until said second path is identified.

13. The method according to claim 7, wherein the call set-up message specifies said desired connection path metric value and the call set-up message is cranked back to a preceding exchange if the value of the reporting field exceeds the desired value.

14. The method according to claim 7, wherein the call set-up message specifies said desired connection path metric value and wherein said desired connection path metric value is set to at least equal the value of the first path metric of the first connection path.

15. The method according to claim 4, wherein said replacement connection path is selected as said second connection path provided that the call set-up message includes a desired connection path metric value and the network is configured to clear back the call set-up to the originating exchange in the event the network is unable to identify any connection path to the destination exchange satisfying the desired path metric.

16. The method according to claim 15, wherein each exchange propagating the call set-up message establishes a bearer channel cross-connection along the replacement connection path.

17. The method according to claim 15, wherein the clearing of connection paths includes dismantling bearer channel cross-connections on the exchanges.

18. The method according to claim 15, wherein the replacement connection path is determined by any one of:
(i) the network using a hop-by-hop routing protocol,
(ii) the originating exchange using a source routing protocol, and
(iii) a centralized network management system.

19. The method according to claim 18, wherein the source routing protocol is a hierarchical map-based protocol and transiting exchanges of the network assist in identifying the replacement connection path through a group of exchanges which are summarized by the originating exchange.

20. The method according to claim 15, wherein the originating exchange checks whether the replacement connection path features an improved path metric and the step of signaling said call set-up message is repeated one or more times until said second path is identified.

21. The method according to claim 15, wherein the call set-up message specifies said desired connection path metric value and the call set-up message is cranked back to a preceding exchange if the value of the reporting field exceeds the desired value.

22. The method according to claim 15, wherein the call set-up message specifies said desired connection path metric value and wherein said desired connection path metric value is set to at least equal the value of the first path metric of the first connection path.

23. A method of optimizing a connection path in a communications network having a plurality of interconnected exchanges, the method comprising:
(a) selecting an established call, the call being associated with a path metric of interest and routed across the network from an originating exchange to a destination exchange over a first connection path;
(b) signaling a call set-up message to the destination exchange from the originating exchange for a second connection path, wherein the message incorporates a reporting field and each exchange propagating the message updates the reporting field until it specifies the actual path metric of the second connection path;
(c) signaling a connect message incorporating the reporting field back to the originating exchange from the destination exchange; and
(d) directing the call over the second connection path provided it features an actual path metric which improves upon the actual path metric of the first connection path.

24. The method according to claim 23, wherein
the method further comprises
dismantling the first connection path after directing the call over the second connection path;
each exchange propagating the call set-up message establishes a bearer channel cross-connection along the second connection path; and
the dismantling of connection path includes dismantling bearer channel cross-connections on the exchanges.

25. The method according to claim 23, wherein the second connection path is determined by any one of
(i) the network using a hop-by-hop routing protocol,
(ii) the originating exchange using a source routing protocol, and
(iii) a centralized network management system.

26. The method according to claim 25, wherein the source routing protocol is a hierarchical map-based protocol and the transiting exchanges of the network assist in identifying the replacement connection path through a group of exchanges which are summarized by the originating exchange.

27. The method according to claim 23, wherein the call set-up message is cleared backed and the step of signaling said call set-up message is repeated one or more times until the second connection path is identified.

28. The method according to claim 27, wherein the call set-up message specifies a desired connection path metric value and the call set-up message is cranked back by the transiting exchanges if the value of the reporting field exceeds the desired connection path metric value.

29. The method according to claim 27, wherein the desired path metric incorporated in the call set-up message is set to at least the value of the actual path metric of the first connection path.

30. A method of optimizing a connection path in a communications network having a plurality of interconnected exchanges, the method comprising:
(a) selecting an established call, the call being routed across the network from an originating exchange to a destination exchange over a first connection path which is associated with a path metric of interest;
(b) signaling a call set-up message from the originating exchange to the destination exchange over the network, wherein the call set-up message incorporates a desired connection path metric value and a corresponding reporting field, and wherein each exchange propagating the call set-up message updates the reporting field;
(c) clearing back the call set-up message in the event the network is unable to identify any connection path to the destination exchange satisfying the desired path metric, and signaling a connect message back to the originating exchange from the destination exchange in the event the network is able to identify a new connection path satisfying the desired path metric; and (d) directing the call over the new connection path.

31. The method according to claim 30, wherein the method further comprises dismantling the first connection path after the call is directed over the new connection path;

each exchange propagating the call set-up message establishes a bearer channel cross-connection along the second connection path;

dismantling of connection paths includes dismantling bearer channel cross-connections on the exchanges.

32. The method according to claim 30, wherein the new connection path is determined by one of:

(i) the network using a hop-by-hop routing protocol, (ii) the originating exchange using a source routing protocol, and (iii) a centralized network management system.

33. The method according to claim 32, wherein the source routing protocol is a hierarchical map-based protocol and transiting exchanges of the network assist in identifying the new connection path through a group of exchanges which are summarized by the originating exchange.

34. The method according to claim 30, wherein the call set-up message is cleared back and the step of signaling said call setup message is repeated until the new connection path is identified.

35. The method according to claim 30, wherein the call set-up message is cranked back by transiting exchanges if the value of the reporting field exceeds the desired connection path metric value.

36. The method according to claim 30, wherein the desired path metric incorporated in the call set-up message is set to at least the value of a first path metric of the first connection path.

37. A method of establishing calls in an ATM network running PNNI, comprising;

(a) assigning a pre-provisioned administrative weight to each physical network element belonging to a predefined type of topological element;

(b) signaling a call sat-up message to a destination exchange from an originating exchange over a connection path, wherein said message incorporates a cumulative administrative weight reporting field and each transiting exchange propagating said message adds the pre-provisioned administrative weights of topological elements associated therewith until said reporting field specifies the cumulative administrative weight of said connection path;

(c) establishing bearer channel cross-connections on said nodes traversing said connection path; and (d) signaling a connect message incorporating said reporting field back to said originating exchange from said destination exchange.

38. The method according to claim 37, wherein said predefined types include nodes and links.

* * * * *